J. EMMERT.
Egg-Beater.
No. 225,693.  Patented Mar. 23, 1880.
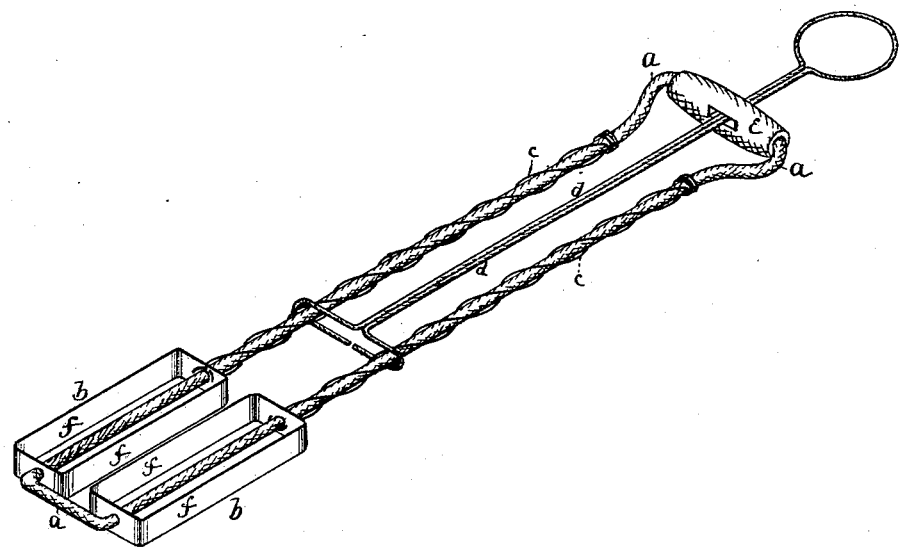

UNITED STATES PATENT OFFICE.

JOHN EMMERT, OF ROCKFORD, ILLINOIS.

EGG-BEATER.

SPECIFICATION forming part of Letters Patent No. 225,693, dated March 23, 1880.

Application filed August 7, 1879.

*To all whom it may concern:*

Be it known that I, JOHN EMMERT, of Rockford, in the county of Winnebago and State of Illinois, have invented a new and useful Improvement in Egg-Beaters; and I do hereby declare the following to be a full, clear, and exact description thereof, which will enable others skilled in the art to which my invention appertains to make and use the same, reference being had to the accompanying drawing, forming part of this specification.

My invention relates to an improvement in devices for beating eggs; and it consists in applying certain new devices to an egg-beater, which shall combine the three great requisites, simplicity, durability, and cheapness.

The figure represents a symmetrical view of my egg-beater, of which the following is a description: $a\ a$ are parallel rods or wires, and may be constructed or formed of one continued wire bent at right angles, and at any required distance from each other, according to the size of the beater required. At the top they are turned inward, entering a hole in the end of the handle forming the frame-work, upon which other portions of the machinery operate. The handle may be made of wood or metal, whichever will answer the purpose best.

$b\ b$ are corresponding dashers, that revolve on the parallel rods, and may be made of wire or sheet metal. If the wire is used, it is first formed around the parallel rods, then shaped into the dasher, and again wound around the perpendicular rods one or more times, after which they are wound in the shape of a spiral, uniting the spiral and dasher together.

If tin or sheet metal is used to form the dashers, it is bent over a frame in order to give the required shape, with hole at each end of dasher. The wire or sheet-metal strips run parallel with each other, of which two or more strips may be used successfully. The corresponding rods enter through the holes in the end of dashers, for them to revolve upon. The dashers should be made long enough to come to the top of an ordinary-sized bowl, in order to keep the spiral clear from the frosting while beating eggs. The dashers, being formed nearly straight at the lower end, are much more desirable than those of circular form. In the case of the circular dasher only a small portion of the dasher—the center part—strikes the eggs, unless a great quantity of eggs are beaten at a time; but with the dasher formed with straight ends one egg can be as successfully beaten as a greater number.

$c\ c$ are the spirals connected to the top of the dashers, and with them revolve.

$d$ is wire passing down through the handle, the lower end of which is bent at right angles, clasping around the spirals, for the purpose of setting in motion the different parts of the machinery, which may be accomplished by an up-and-down movement.

Having thus described my invention, what I claim as new, and desire to secure by Letters Patent, is—

1. The egg-beater composed of a continued or perpetual wire or iron rod, forming a frame, upon which revolve a pair of dashers, passing each other at their outer edges at every revolution they make.

2. The egg-beater composed of the continued wire $a\ a$, corresponding dashers $b\ b$, parallel strips in dashers $f\ f$, spirals $c\ c$, motor $d$, and handle $e$, combined and arranged for the purposes set forth.

JOHN EMMERT.

Witnesses:
W. WATSON,
JAMES FERGUSON.